(12) United States Patent
Fulghum et al.

(10) Patent No.: US 11,595,646 B2
(45) Date of Patent: Feb. 28, 2023

(54) SLICED ENCODING AND DECODING FOR REMOTE RENDERING

(71) Applicant: Facebook Technologies, LLC, Menlo Park, CA (US)

(72) Inventors: Matthew Robert Fulghum, San Mateo, CA (US); Reza Nourai, Danville, CA (US); Behnam Bastani, Palo Alto, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/912,290

(22) Filed: Jun. 25, 2020

(65) Prior Publication Data

US 2021/0092373 A1 Mar. 25, 2021

Related U.S. Application Data

(60) Provisional application No. 62/905,642, filed on Sep. 25, 2019.

(51) Int. Cl.

| | |
|---|---|
| *H04N 19/119* | (2014.01) |
| *H04N 19/174* | (2014.01) |
| *G02B 27/01* | (2006.01) |
| *G06F 3/01* | (2006.01) |
| *G06T 19/00* | (2011.01) |
| *H04L 65/70* | (2022.01) |
| *H04L 65/75* | (2022.01) |

(52) U.S. Cl.
CPC ....... *H04N 19/119* (2014.11); *G02B 27/0172* (2013.01); *G06F 3/011* (2013.01); *G06F 3/017* (2013.01); *G06T 19/006* (2013.01); *H04L 65/70* (2022.05); *H04L 65/75* (2022.05); *H04N 19/174* (2014.11)

(58) Field of Classification Search
CPC .......... G06F 3/011; G06F 3/013; G06F 3/012; G02B 27/017; G02B 2027/014; G02B 2027/0187; G02B 2027/0138; G02B 27/0093; G06T 19/006; H04N 13/344; H04N 19/597; H04N 13/161; H04N 21/816
See application file for complete search history.

(56) References Cited

U.S. PATENT DOCUMENTS

2019/0394503 A1* 12/2019 Zhang ............... H04N 21/42202
2021/0037250 A1* 2/2021 Makar .................. H04N 19/166

* cited by examiner

*Primary Examiner* — Farhan Mahmud
(74) *Attorney, Agent, or Firm* — Foley & Lardner LLP

(57) ABSTRACT

Disclosed herein are related to a device and a method of remotely rendering an image. In one approach, a device divides an image of an artificial reality space into a plurality of slices. In one approach, the device encodes a first slice of the plurality of slices. In one approach, the device encodes a portion of a second slice of the plurality of slices, while the device encodes a portion of the first slice. In one approach, the device transmits the encoded first slice of the plurality of slices to a head wearable display. In one approach, the device transmits the encoded second slice of the plurality of slices to the head wearable display, while the device transmits a portion of the encoded first slice to the head wearable display.

20 Claims, 8 Drawing Sheets

SLICED ENCODING AND DECODING FOR REMOTE RENDERING

CROSS-REFERENCE TO RELATED APPLICATION

This application claims priority to U.S. Provisional Patent Application No. 62/905,642, filed Sep. 25, 2019, which is incorporated by reference in its entirety for all purposes.

FIELD OF DISCLOSURE

The present disclosure is generally related to processing an image of an artificial reality space, including but not limited to performing encoding, decoding, or a combination of encoding and decoding to render an image of an artificial reality space.

BACKGROUND

Artificial reality such as a virtual reality (VR), an augmented reality (AR), or a mixed reality (MR) provides immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of an artificial reality (e.g., a VR space, an AR space, or a MR space).

In one implementation, an image of a virtual object is generated by a console communicatively coupled to the HWD. In one example, the HWD includes various sensors that detect a location of the HWD and a gaze direction of the user wearing the HWD, and transmits the detected location and gaze direction to the console through a wired connection or a wireless connection. The console can determine a user's view of the space of the artificial reality according to the detected location and gaze direction, and generate an image of the space of the artificial reality corresponding to the user's view. The console can transmit the generated image to the HWD, by which the image of the space of the artificial reality corresponding to the user's view can be presented to the user. In one aspect, the process of detecting the location of the HWD and the gaze direction of the user wearing the HWD, and rendering the image to the user should be performed within a frame time (e.g., less than 11 ms). Any latency between a movement of the user wearing the HWD and an image displayed corresponding to the user movement can cause judder, which may result in motion sickness and can degrade the user experience.

SUMMARY

Various embodiments disclosed herein are related to a device for remote rendering of an artificial reality space. In some embodiments, the device includes a content generator comprising at least one processor. In some embodiments, the content generator is configured to partition an image of an artificial reality space into a plurality of slices. In some embodiments, the content generator is configured to encode a first slice of the plurality of slices. In some embodiments, the content generator is configured to encode a second slice of the plurality of slices, which includes encoding a portion of the second slice while the content generator encodes a portion of the first slice. In some embodiments, the device includes a communication interface coupled to the content generator. In some embodiments, the communication interface is configured to transmit the encoded first slice of the plurality of slices to a head wearable display. In some embodiments, the communication interface is configured to transmit a portion of the encoded second slice of the plurality of slices to the head wearable display, while the communication interface transmits a portion of the encoded first slice to the head wearable display.

In some embodiments, the first slice and the second slice are separated by a boundary. In some embodiments, the content generator is further configured to generate motion vectors of the image, wherein the motion vectors do not traverse the boundary between the first slice and the second slice.

In some embodiments, the communication interface is configured to transmit another portion of the encoded first slice, while the content generator encodes another portion of the second slice. In some embodiments, the content generator is further configured to encode a third slice of the plurality of slices, which includes encoding a portion of the third slice while the content generator encodes another portion of the second slice. In some embodiments, the communication interface is further configured to transmit a portion of the encoded third slice of the plurality of slices to the head wearable display, while the communication interface transmits another portion of the encoded second slice to the head wearable display. In some embodiments, the communication interface is configured to transmit an additional portion of the encoded second slice, while the content generator encodes another portion of the third slice.

In some embodiments, the communication interface is further configured to receive sensor measurements indicating a location or an orientation of the head wearable display. In some embodiments, the content generator is configured to generate the image of the artificial reality space according to the location or the orientation of the head wearable display.

Various embodiments disclosed herein are related to a method for remote rendering of an artificial reality space. In some embodiments, the method includes partitioning, by a device, an image of an artificial reality space into a plurality of slices. In some embodiments, the method includes encoding, by the device, a first slice of the plurality of slices. In some embodiments, the method includes encoding, by the device, a second slice of the plurality of slices, which includes encoding a portion of the second slice while the device encodes a portion of the first slice. In some embodiments, the method includes transmitting, by the device, the encoded first slice of the plurality of slices to a head wearable display. In some embodiments, the method includes transmitting, by the device, a portion of the encoded second slice of the plurality of slices to the head wearable display, while the device transmits a portion of the encoded first slice to the head wearable display.

In some embodiments, the first slice and the second slice are separated by a boundary. In some embodiments, the method includes generating, by the device, motion vectors of the image, wherein the motion vectors do not traverse the boundary between the first slice and the second slice.

In some embodiments, the method includes transmitting, by the device, another portion of the encoded first slice, while the device encodes another portion of the second slice. In some embodiments, the method includes encoding, by the device, a third slice of the plurality of slices, which includes encoding a portion of the third slice while the device encodes another portion of the second slice. In some embodiments, the method includes transmitting, by the device, a portion of the encoded third slice of the plurality of slices to the head wearable display, while the device transmits another portion of the encoded second slice to the head wearable display. In some embodiments, the method includes transmitting, by the device, an additional portion of the encoded second slice, while the device encodes another portion of the third slice.

In some embodiments, the method includes receiving, by the device, sensor measurements indicating a location or an orientation of the head wearable display. In some embodiments, the method includes generating, by the device, the image of the artificial reality space according to the location or the orientation of the head wearable display.

Various embodiment disclosed herein are related to a device for remote rendering of an artificial reality space. In some embodiments, the device includes a communication interface configured to receive, from another device, an encoded first slice of an image of an artificial reality space. In some embodiments, the communication interface is configured to receive, from the another device, a portion of an encoded second slice of the image, while the communication interface receives a portion of the encoded first slice. In some embodiments, the device includes an image renderer comprising at least one processor. In some embodiments, the image renderer is coupled to the communication interface. In some embodiments, the image renderer is configured to decode the encoded first slice of the image. In some embodiments, the image renderer is configured to decode the portion of the encoded second slice of the image, while the image renderer decodes the portion of the encoded first slice. In some embodiments, the image renderer is configured to combine the decoded first slice of the image and the decoded second slice of the image. In some embodiments, the image renderer is configured to render the image based on the combination of the decoded first slice of the image and the decoded second slice of the image.

In some embodiments, the communication interface is configured to receive another portion of the encoded second slice, while the image renderer decodes another portion of the first slice. In some embodiments, the decoded first slice and the decoded second slice are separated by a boundary. In some embodiments, motion vectors of the decoded first slice and motion vectors of the decoded second slice do not traverse the boundary between the decoded first slice and the decoded second slice.

In some embodiments, the communication interface is further configured to receive a portion of an encoded third slice of the plurality of slices from the another device, while the device receives another portion of the encoded second slice from the another device. In some embodiments, the image renderer is further configured to decode the portion of the encoded third slice of the plurality of slices, while the image renderer decodes the another portion of the encoded second slice.

In some embodiments, the device includes sensors configured to generate sensor measurements indicating a location or an orientation of the device. In some embodiments, the communication interface is configured to transmit the sensor measurements to the another device, and receive the encoded first slice and the encoded second slice of the image, in response to transmitting the sensor measurements.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
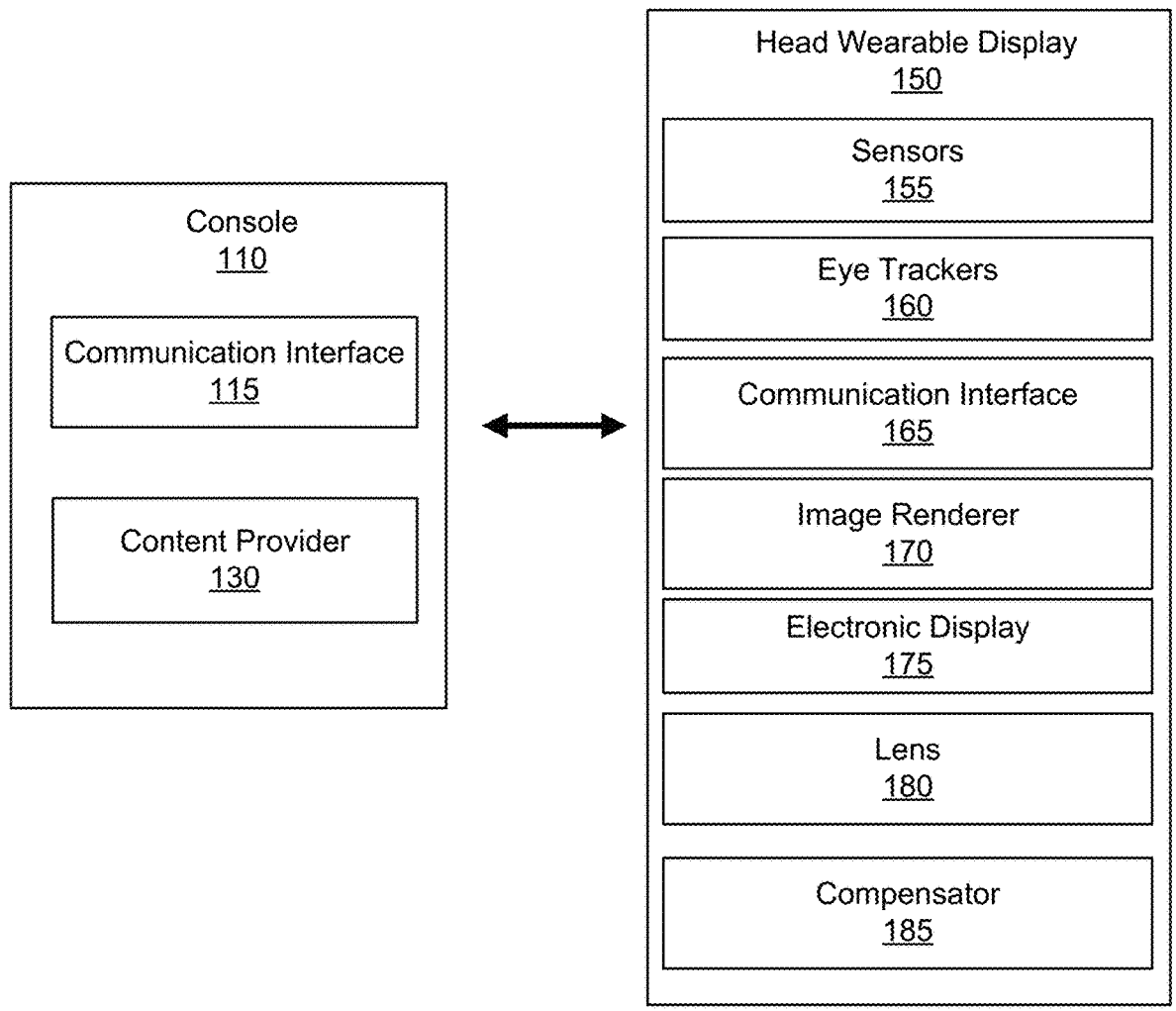
FIG. 1 is a diagram of a system environment including an artificial reality system, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are related to systems, devices, and methods for remotely rendering an image of an artificial reality space (e.g., an AR space, a VR space, or a MR space) based on slice encoding and decoding. In one aspect, disclosed slice encoding and decoding includes dividing or partitioning the image into a plurality of slices, and processing the plurality of slices in a pipeline configuration. In one approach, a console divides an image (e.g., of an artificial reality space) into a plurality of slices. In one approach, the console encodes the plurality of slices of the image through a pipeline configuration. Moreover, the console transmits the encoded plurality of slices to a user device or display device, such as a head wearable display (HWD) through a pipeline configuration. This disclosure may sometimes reference such a HWD by way of illustration, for the user device or display device. In one approach, the HWD receives encoded slices of the image from the console, and processes the encoded portions through a pipeline configuration to decode and render the image. In one aspect, the HWD decodes different encoded slices of the image independently. The HWD (e.g., via an image combiner) may combine the decoded slices of the image, and can render the image according to the combination.

Advantageously, slicing an image into a plurality of slices, and processing the plurality of slices through a pipeline configuration as disclosed herein allow a faster, efficient and/or successful transmission and rendition of an image of an artificial reality space. For example, the console may encode a first slice of the image. The console may also encode a portion of a second slice of the image, while a portion of the first slice of the image is encoded. Once the encoding of the first slice of the image is complete, the console may transmit the encoded first slice of the image (e.g., without waiting for the all portions of the image to be encoded, such as while another portion of the second slice of the image is encoded). Similarly, the HWD may receive the encoded first slice of the image from the console. The HWD may receive a portion of the encoded second slice of the image, while a portion of the encoded first slice of the image is received. After receiving the encoded first slice of the image, the HWD may decode a portion of the encoded first slice of the image, while a portion of the encoded second slice of the image is received. In one aspect, encoding and decoding a high quality image (e.g., 1920 by 1080 pixels, 2048 by 1152 pixels, or higher) may consume a large amount of computational resources and may not be completed within a frame time (e.g., 11 ms). For example, as a number of pixels increases, amount of computational resources for encoding or decoding may increase exponentially. By encoding and decoding slices of an image through a pipeline configuration, the amount of computational resources for encoding and decoding can be reduced compared to encoding and decoding the full image. Moreover, an image generated by the console can be transmitted and rendered by the HWD within a short time period (e.g., 11 ms) by processing slices of the image in a pipeline configuration.

FIG. 1 is a block diagram of an example artificial reality system environment 100 in which a console 110 operates. In some embodiments, the artificial reality system environment 100 includes a HWD 150 worn by a user, and a console 110 providing content of artificial reality to the HWD 150. A head wearable display (HWD) may be referred to as, include, or be part of a head mounted display (HMD), head mounted device (HMD), head wearable device (HWD), head worn display (HWD) or head worn device (HWD). In one aspect, the HWD 150 may detect its location and a gaze direction of the user wearing the HWD 150, and provide the detected location and the gaze direction to the console 110. The console 110 may determine a view within the space of the artificial reality corresponding to the detected location and the gaze direction, and generate an image depicting the determined view. The console 110 may provide the image to the HWD 150 for rendering. In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the console 110 may be performed by the HWD 150. For example, some of the functionality of the HWD 150 may be performed by the console 110.

In some embodiments, the HWD 150 is an electronic component that can be worn by a user and can present or provide an artificial reality experience to the user. The HWD 150 may render one or more images, video, audio, or some combination thereof to provide the artificial reality experience to the user. In some embodiments, audio is presented via an external device (e.g., speakers and/or headphones) that receives audio information from the HWD 150, the console 110, or both, and presents audio based on the audio information. In some embodiments, the HWD 150 includes sensors 155, eye trackers 160, a communication interface 165, an image renderer 170, an electronic display 175, a lens 180, and a compensator 185. These components may operate together to detect a location of the HWD 150 and/or a gaze direction of the user wearing the HWD 150, and render an image of a view within the artificial reality corresponding to the detected location of the HWD 150 and/or the gaze direction of the user. In other embodiments, the HWD 150 includes more, fewer, or different components than shown in FIG. 1.

In some embodiments, the sensors 155 include electronic components or a combination of electronic components and software components that detect a location and an orientation of the HWD 150. Examples of sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the eye trackers 160 include electronic components or a combination of electronic components and software components that determine a gaze direction of the user of the HWD 150. In some embodiments, the eye trackers 160 include two eye trackers, where each eye tracker 160 captures an image of a corresponding eye and determines a gaze direction of the eye. In one example, the eye tracker 160 determines an angular rotation of the eye, a translation of the eye, a change in the torsion of the eye, and/or a change in shape of the eye, according to the captured image of the eye, and determines the relative gaze direction with respect to the HWD 150, according to the determined angular rotation, translation and the change in the torsion of the eye. In one approach, the eye tracker 160 may shine or project a predetermined reference or structured pattern on a portion of the eye, and capture an image of the eye to analyze the pattern projected on the portion of the eye to determine a relative gaze direction of the eye with respect to the HWD 150. In some embodiments, the eye trackers 160 incorporate the orientation of the HWD 150 and the relative gaze direction with respect to the HWD 150 to determine a gate direction of the user. Assuming for an example that the HWD 150 is oriented at a direction 30 degrees from a reference direction, and the relative gaze direction of the HWD 150 is −10 degrees (or 350 degrees) with respect to the HWD 150, the eye trackers 160 may determine that the gaze direction of the user is 20 degrees from the reference direction. In some embodiments, a user of the HWD 150 can configure the HWD 150 (e.g., via user settings) to enable or disable the eye trackers 160. In some embodiments, a user of the HWD 150 is prompted to enable or disable the eye trackers 160.

In some embodiments, the communication interface 165 includes an electronic component or a combination of an electronic component and a software component that communicates with the console 110. The communication interface 165 may communicate with a communication interface 115 of the console 110 through a communication link. The communication link may be a wireless link, a wired link, or both. Examples of the wireless link can include a cellular communication link, a near field communication link, Wi-Fi, Bluetooth, or any communication wireless communication link. Examples of the wired link can include a USB, Ethernet, Firewire, HDMI, or any wired communication link. In the embodiments, in which the console 110 and the head wearable display 150 are implemented on a single device, the communication interface 165 may communicate with the console 110 through a bus connection or a conductive trace. Through the communication link, the communication interface 165 may transmit to the console 110 sensor measurements indicating the determined location of the HWD 150 and the determined gaze direction of the user. Moreover, through the communication link, the communication interface 165 may receive from the console 110 sensor measurements indicating or corresponding to an image to be rendered.

In some embodiments, the image renderer 170 includes an electronic component or a combination of an electronic component and a software component that generates one or more images for display, for example, according to a change in view of the space of the artificial reality. In some embodiments, the image renderer 170 is implemented as a processor (or a graphical processing unit (GPU)) that executes instructions to perform various functions described herein. The image renderer 170 may receive, through the communication interface 165, data describing an image to be rendered, and render the image through the electronic display 175. In some embodiments, the data from the console 110 may be encoded, and the image renderer 170 may decode the data to generate and render the image. In one aspect, the image renderer 170 receives the encoded image from the console 110, and decodes the encoded image, such that a communication bandwidth between the console 110 and the HWD 150 can be reduced. In one aspect, the process of detecting, by the HWD 150, the location and the orientation of the HWD 150 and/or the gaze direction of the user wearing the HWD 150, and generating and transmitting, by the console 110, a high resolution image (e.g., 1920 by 1080 pixels, or 2048 by 1152 pixels) corresponding to the detected location and the gaze direction to the HWD 150 may be computationally exhaustive and may not be performed within a frame time (e.g., less than 11 ms or 8 ms). In one aspect, the image renderer 170 generates one or more images through a shading process and a reprojection process when an image from the console 110 is not received within the frame time. For example, the shading process and the reprojection process may be performed adaptively, according to a change in view of the space of the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HWD 150 is worn by a user, the electronic display 175 is located proximate (e.g., less than 3 inches) to the user's eyes. In one aspect, the electronic display 175 emits or projects light towards the user's eyes according to image generated by the image renderer 170.

In some embodiments, the lens 180 is a mechanical component that alters received light from the electronic display 175. The lens 180 may magnify the light from the electronic display 175, and correct for optical error associated with the light. The lens 180 may be a Fresnel lens, a convex lens, a concave lens, a filter, or any suitable optical component that alters the light from the electronic display 175. Through the lens 180, light from the electronic display 175 can reach the pupils, such that the user can see the image displayed by the electronic display 175, despite the close proximity of the electronic display 175 to the eyes.

In some embodiments, the compensator 185 includes an electronic component or a combination of an electronic component and a software component that performs compensation to compensate for any distortions or aberrations. In one aspect, the lens 180 introduces optical aberrations such as a chromatic aberration, a pin-cushion distortion, barrel distortion, etc. The compensator 185 may determine a compensation (e.g., predistortion) to apply to the image to be rendered from the image renderer 170 to compensate for the distortions caused by the lens 180, and apply the determined compensation to the image from the image renderer 170. The compensator 185 may provide the predistorted image to the electronic display 175.

In some embodiments, the console 110 is an electronic component or a combination of an electronic component and a software component that provides content to be rendered to the HWD 150. In one aspect, the console 110 includes a communication interface 115 and a content provider 130. These components may operate together to determine a view (e.g., a FOV of the user) of the artificial reality corresponding to the location of the HWD 150 and the gaze direction of the user of the HWD 150, and can generate an image of the artificial reality corresponding to the determined view. In other embodiments, the console 110 includes more, fewer, or different components than shown in FIG. 1. In some embodiments, the console 110 is integrated as part of the HWD 150.

In some embodiments, the communication interface 115 is an electronic component or a combination of an electronic component and a software component that communicates with the HWD 150. The communication interface 115 may be a counterpart component to the communication interface 165 to communicate with a communication interface 115 of the console 110 through a communication link (e.g., USB cable). Through the communication link, the communication interface 115 may receive from the HWD 150 sensor measurements indicating the determined location and orientation of the HWD 150 and/or the determined gaze direction of the user. Moreover, through the communication link, the communication interface 115 may transmit to the HWD 150 data describing an image to be rendered.

The content provider 130 is a component that generates content to be rendered according to the location and orientation of the HWD 150 and/or the gaze direction of the user of the HWD 150. In one aspect, the content provider 130 determines a view of the artificial reality according to the location and orientation of the HWD 150 and/or the gaze direction of the user of the HWD 150. For example, the content provider 130 maps the location of the HWD 150 in a physical space to a location within an artificial reality space, and determines a view of the artificial reality space along a direction corresponding to an orientation of the HWD 150 and/or the gaze direction of the user from the mapped location in the artificial reality space. The content provider 130 may generate image data describing an image of the determined view of the artificial reality space, and transmit the image data to the HWD 150 through the communication interface 115. In some embodiments, the content provider 130 generates metadata including motion vector information, depth information, edge information, object information, etc., associated with the image, and transmits the metadata with the image data to the HWD 150 through the communication interface 115. The content provider 130 may encode and/or encode the data describing the image, and can transmit the encoded and/or encoded data to the HWD 150. In some embodiments, the content provider 130 generates and provides the image to the HWD 150 periodically (e.g., every one second).

Figure 2:
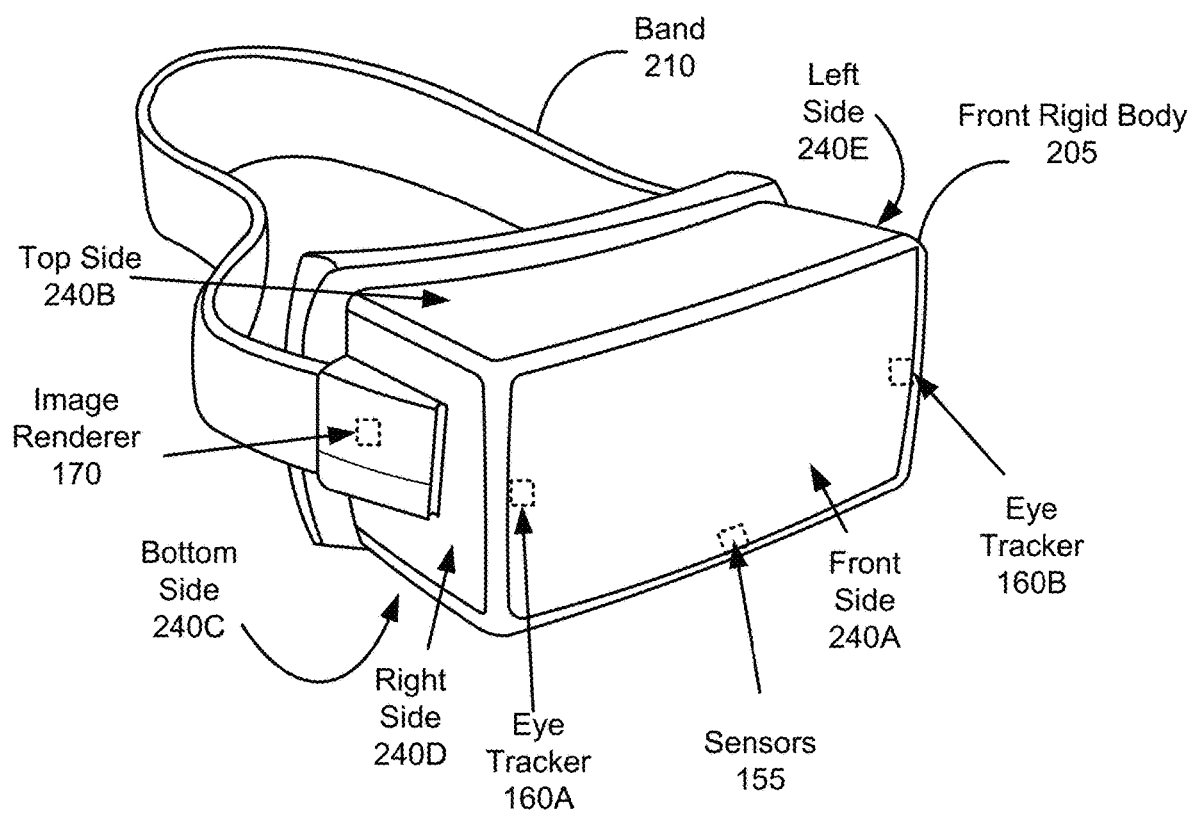
FIG. 2 is a diagram of a head wearable display, according to an example implementation of the present disclosure.

FIG. 2 is a diagram of a HWD 150, in accordance with an example embodiment. In some embodiments, the HWD 150 includes a front rigid body 205 and a band 210. The front rigid body 205 includes the electronic display 175 (not shown in FIG. 2), the lens 180 (not shown in FIG. 2), the sensors 155, the eye trackers 160A, 160B, and the image renderer 170. In the embodiment shown by FIG. 2, the sensors 155 are located within the front rigid body 205, and may not visible to the user. In other embodiments, the HWD 150 has a different configuration than shown in FIG. 2. For example, the image renderer 170, the eye trackers 160A, 160B, and/or the sensors 155 may be in different locations than shown in FIG. 2.

Figure 3:
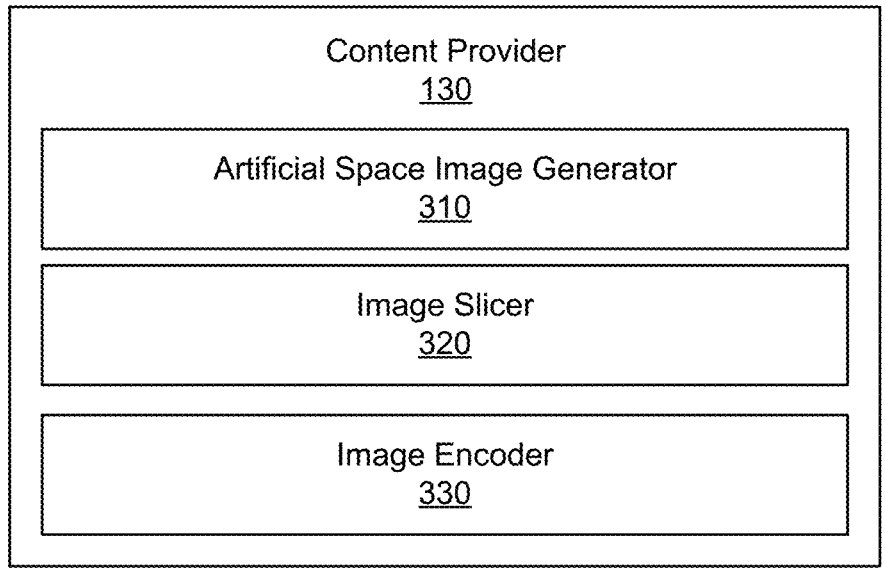
FIG. 3 is a diagram of a content provider, according to an example implementation of the present disclosure.

FIG. 3 is a diagram of the content provider 130, according to an example implementation of the present disclosure. In some embodiments, the content provider 130 includes an artificial space image generator 310, an image slicer 320, and an image encoder 330. These components may generate an image of a view of an artificial reality, slice or partition the image into a plurality of slices, and encode the plurality of slices through a pipeline configuration. The content provider 130 may be embodied as one or more processors and a non-transitory computer readable medium storing instructions executable by the one or more processors. In some embodiments, the content provider 130 includes more, fewer, or different components than shown in FIG. 3. In some embodiments, functionalities of some components of the content provider 130 can be performed by the HWD 150.

In some embodiments, the artificial space image generator 310 includes a component that detects, estimates, or determines a view of the artificial reality corresponding to the location and/or orientation of the HWD 150, and/or the gaze direction of the user of the HWD 150, and generates an image of the artificial reality corresponding to the determined view. In one approach, the artificial space image generator 310 receives signals or sensor measurements indicating the location and the orientation of the HWD 150 and/or the gaze direction of the user of the HWD 150 from the HWD 150. The artificial space image generator 310 may map the location of the HWD 150 in a physical space to a location within the artificial space, and can determine a view of the artificial space along a direction corresponding to the orientation of the HWD 150 and/or the gaze direction from the mapped location in the artificial space. In one approach, the artificial space image generator 310 may track a change in the location and the orientation of the HWD 150 and the gaze direction of the user of the HWD 150, and update the previous view of the space of the artificial reality according to the tracked change to determine the current view of the artificial space. For example, if a user turns his head 45 degrees, then a view of the artificial space rotated 45 degrees from the previous view can be determined. For another example, if a user moves a step forward, then a view of the artificial space from a virtual location shifted from the previous location by a distance corresponding to the step can be determined. The artificial space image generator 310 may generate an image of the determined view of the artificial space.

In some embodiments, the image slicer 320 includes a component that slices, partitions, segments or divides the image into a plurality of slices. In one aspect, the image slicer 320 divides the image into a predetermined number (e.g., three, five or ten) of slices. For example, the image slicer 320 divides the image into three slices along a horizontal direction. In one aspect, the image slicer 320 divides the image into different slices, such that the slices of the image can be encoded or processed separately. For example, the image slicer 320 groups, isolates, processes, generates and/or modifies motion vectors such that motion vectors do not cross two or more slices. For example, the image slicer 320 can determine and/or ensure that a motion vector for one slice does not trespass or extend beyond the boundary of the slice to another slice. This can allow for independent or decoupled processing (e.g., encoding, compression, transmission, decompression, decoding) of the individual slices of the images without having to account for or depend on certain aspects of adjacent slice(s) of the image.

In some embodiments, the image encoder 330 includes a component that encodes the slices of the image. In one aspect, the image encoder 330 encodes the slices of the image through a pipeline configuration. The image encoder 330 may be implemented by multiple processors executed by a single encoding application or multiple encoding applications. In one example, the image encoder 330 may encode a first slice of the image. The image encoder 330 may also encode a portion of a second slice of the image, while the image encoder 330 encodes a portion of the first slice of the image. The image encoder 330 may encode three or more slices of the image in a partially overlapping manner. The image encoder 330 may for instance include a number of hardware and/or software encoding units, threads, pipelined components and/or encoding instances, to handle overlapping and/or parallel processing of portions of the image.

In some embodiments, the image encoder 330 configures the communication interface 115 to transmit encoded slices of the image to the HWD 150. The image encoder 330 may configure the communication interface 115 to transmit the encoded slices of the image in a pipeline configuration. For example, the image encoder 330 may configure the communication interface 115 to transmit a portion of the encoded first slice of the image, while the image encoder 330 encodes a portion of the second slice of the image. If the encoding of the second slice of the image is completed, the image encoder 330 may configure the communication interface 115 to transmit a portion of the encoded second slice of the image, while the communication interface 115 transmits a portion of the encoded first slice of the image. Accordingly, slices of the image can be encoded and transmitted in a pipeline configuration.

Figure 4:
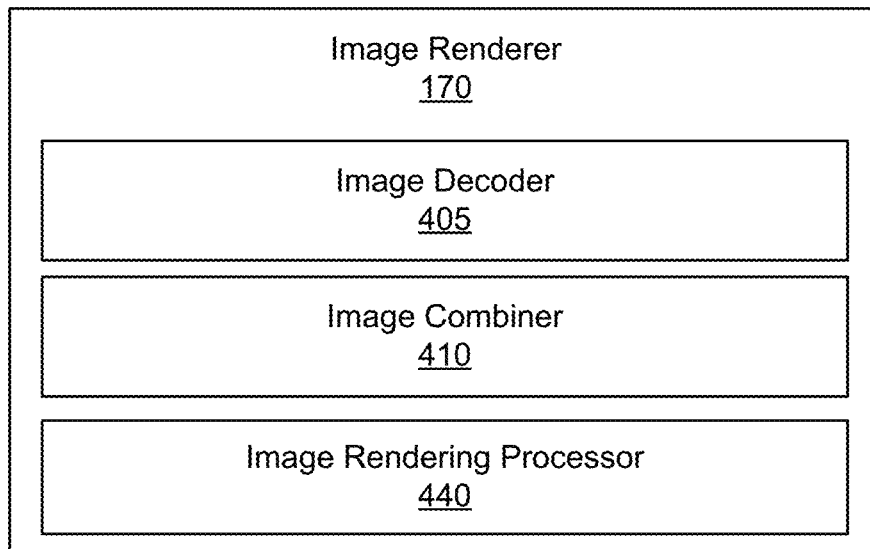
FIG. 4 is a diagram of an image renderer, according to an example implementation of the present disclosure.

FIG. 4 is a diagram of an image renderer 170, according to an example implementation of the present disclosure. In some embodiments, the image renderer 170 includes an image decoder 405, an image combiner 410, and an image rendering processor 440. These components may operate together to receive encoded slices of the image from the console 110 through the communication interface 165, and can decode the encoded slices for rendering. In one aspect, these components may operate together to apply additional processes (e.g., a shading process, a reprojection process, compensation, predistortion, or any combination of them) for rendering. The image renderer 170 may be embodied as one or more processors and a non-transitory computer readable medium storing instructions executable by the one or more processors. In other embodiments, the image renderer 170 includes more, fewer, or different components than shown in FIG. 4. In some embodiments, the image renderer 170 is designed and implemented to store or maintain a version (e.g., details) of the world view corresponding to the artificial reality, even the unrendered parts of the world view, in some embodiments. The image renderer 170 can access, apply and/or render the details of the world view, e.g., as predictions about the 3D space of the artificial reality, as these come into view of a user due to movement or interaction.

The image decoder 405 may include a component that decodes encoded slices of the image from the console 110 in a pipeline configuration. The image encoder 330 may be implemented by multiple processors executed by a single decoding application or multiple decoding applications. The image decoder 405 may receive the encoded first slice of the image from the console 110. The image decoder 405 may receive a portion of the encoded second slice of the image through the communication interface 165, while the image decoder 405 receives a portion of the encoded first slice of the image. After receiving the encoded first slice of the image, the image decoder 405 may decode the encoded first slice of the image, while the image decoder 405 receives another portion of the encoded second slice of the image through the communication interface 165. The image decoder 405 may decode a portion of the encoded second slice of the image, while the image decoder 405 decodes a portion of the encoded first slice of the image. In one aspect, the image decoder 405 decodes different encoded slices of the image independently. For example, motion vectors of a slice of the image do not cross or trespass into another slice of the image, such that each slice of the image can be decoded or otherwise processed without relying on other slices of the image. Accordingly, slices of the image can be received and decoded in a pipeline configuration.

The image combiner 410 can include or correspond to a component that combines the decoded slices of the image. In some embodiments, the image combiner 410 includes or is coupled to a buffer that stores different slices of the image from the image decoder 405. Once a predetermined number of slices of the image are received and stored by the buffer, the image combiner 410 may combine the slices of the image, and provide the combined image to the image rendering processor 440. After providing the combined image to the image rendering processor 440, the image combiner 410 may clear the buffer.

The image rendering processor 440 can include or correspond to a component that renders the combined image from the image combiner 410. The image rendering processor 440 may provide the combined image to the electronic display 175 for presentation. In some embodiments, the image generated by the image rendering processor 440 may be processed or compensated by the compensator 185 to correct for optical aberrations or distortions. In some embodiments, the image rendering processor 440 obtains updated sensor measurements indicating an updated location and an updated orientation of the HWD 150, and/or an updated gaze direction of the user, and performs a shading process and/or a reprojection process on the combined image to generate an image of an artificial reality corresponding to the updated location and the updated orientation of the HWD 150, and/or the updated gaze direction of the user. Moreover, the image rendering processor 440 may render or present, through the electronic display 175, the image corresponding to the updated location and the updated orientation of the HWD 150, and/or the updated gaze direction of the user.

Figure 5:
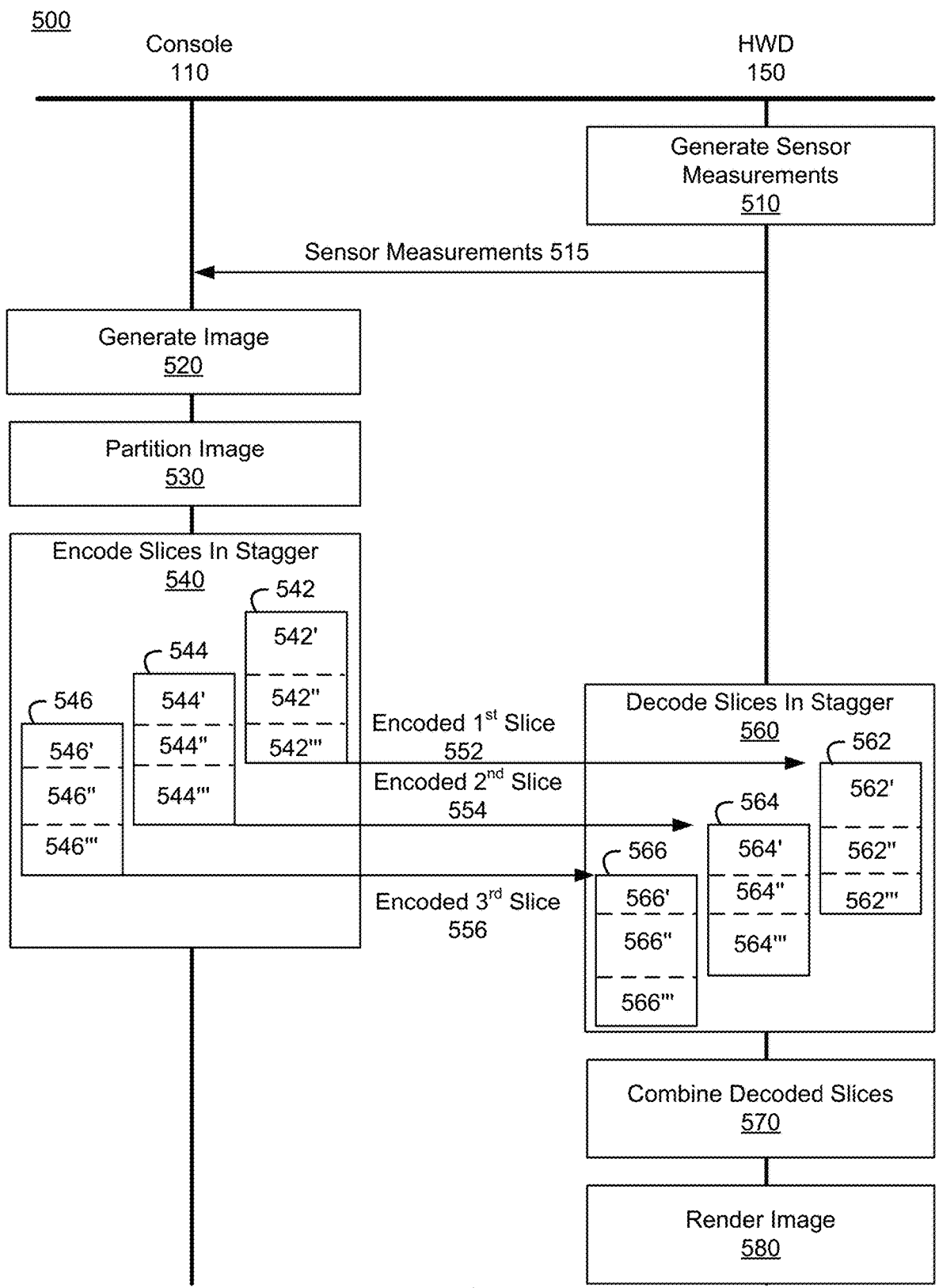
FIG. 5 is an interaction diagram of a process of performing remote rendering based on slice encoding and decoding, according to an example implementation of the present disclosure.

FIG. 5 is an interaction diagram showing a process 500 of performing remote rendering based on slice encoding and decoding, according to an example implementation of the present disclosure. In some embodiments, the process 500 is performed by the console 110 and the HWD 150. In some embodiments, the process 500 is performed by other entities. In some embodiments, the process 500 includes more, fewer, or different steps than shown in FIG. 5.

In one approach, the HWD 150 generates 510 sensor measurements indicating a location and an orientation of the HWD 150. The HWD 150 may include sensors 155 that detect a location and an orientation of the HWD 150, and generate sensor measurements indicating the detected location and orientation of the HWD 150. The HWD 150 may also include eye trackers 160 that detect a gaze direction of the eyes of the user, and generate sensor measurements indicating the detected gaze direction. In some embodiments, a user of the HWD 150 is prompted to enable or disable the eye trackers 160.

In one approach, the HWD 150 transmits 515 sensor measurements to the console 110. The HWD 150 may include the communication interface 165 that transmits the sensor measurements to the console 110. The communication interface 165 may transmit the sensor measurements through a wired link (e.g., ETHERNET, USB, HDMI, etc.) or a wireless link (e.g., Wi-Fi, Bluetooth, or cellular data network standards (e.g., 3G, 4G, 5G, 60 GHz, LTE, etc.)).

In one approach, the console 110 generates 520 an image of an artificial reality according to the sensor measurements. The console 110 may include a communication interface 115 that receives the sensor measurements from the HWD 150. The console 110 may also include a content provider 130 that determines a view of the artificial reality according to the location and orientation of the HWD 150 and/or the gaze direction of the user of the HWD 150. For example, the content provider 130 includes the artificial space image generator 310 that maps the location of the HWD 150 in a physical space to a location within an artificial reality space, and determines a view of the artificial reality space along a direction corresponding to an orientation of the HWD 150 and/or the gaze direction of the user from the mapped location in the artificial reality space. The artificial space image generator 310 may generate image data describing an image of the determined view of the artificial reality space.

In one approach, the console 110 divides, slices, or partitions 530 the image into a plurality of slices 542, 544, 546. The content provider 130 may include the image slicer 320 that divides the image into a predetermined number of slices 542, 544, 546. The number of slices may be determined based on timing for encoding, transmitting and decoding a slice to allow an image to be generated by the console 110 and presented by the HWD 150 within a frame time (e.g., 11 ms). Although in the example shown in FIG. 5, the image slicer 320 divides the image into three slices 542, 544, 546, the image slicer 320 may divide the image into any number (e.g., two or higher) of slices. For example, the image slicer 320 divides the image along a horizontal direction, a vertical direction, or any direction.

In one approach, the console 110 encodes 540 slices 542, 544, 546. The console 110 may include the image encoder 330 that encodes the slices 542, 544, 546 in a pipeline configuration in a staggered manner. For example, the image encoder 330 performs encoding on the first slice 542. The image encoder 330 may perform encoding on a first portion 542' of the first slice 542, while the image encoder 330 does not perform encoding on the other slices 544, 546. The image encoder 330 may perform encoding on a first portion 544' of the second slice 544, while the image encoder 330 performs encoding on a second portion 542" of the first slice 542. The image encoder 330 may perform encoding on a first portion 546' of the third slice 546, while the image encoder 330 performs encoding on a third portion 542''' of the first slice 542 and on a second portion 544" of the second slice 544. The image encoder 330 may perform encoding on a second portion 546" of the third slice 546, while the image encoder 330 performs encoding on a third portion 544''' of the second slice 544. Then, the image encoder 330 may perform encoding on a third portion 546''' of the third slice 546 to complete encoding.

In one approach, the console 110 transmits 552, 554, 556 the encoded slices. The communication interface 115 may transmit the encoded slices through a wired link (e.g., ETHERNET, USB, HDMI, etc.) or a wireless link (e.g., Wi-Fi, Bluetooth, or cellular data network standards (e.g., 3G, 4G, 5G, 60 GHz, LTE, etc.)). The communication interface 115 may transmit the encoded slices in a pipeline configuration in a staggered manner or a partially overlapping manner. For example, after completing encoding of the first slice 542, the communication interface 115 may transmit 552 the encoded first slice to the HWD 150, while the image encoder 330 encodes the third portion 544''' of the second slice 544. For example, after completing encoding of the second slice 544, the communication interface 115 may transmit 554 the encoded second slice to the HWD 150, while the image encoder 330 encodes the third portion 546''' of the third slice 546. After completing encoding of the third slice 546, the communication interface 115 may transmit 556 the encoded third slice to the HWD 150.

In one approach, the HWD 150 receives and decodes 560 the encoded slices. The communication interface 165 may receive the encoded slices from the console 110. The HWD 150 may include the image renderer 170 that decodes the encoded slices in a pipeline configuration in a staggered manner. For example, the image renderer 170 includes the image decoder 405 that performs decoding on the encoded first slice 562. The image decoder 405 may perform decoding on a first portion 562' of the encoded first slice 562, while the image decoder 405 does not perform decoding on the other encoded slices 564, 566. The image decoder 405 may perform decoding on a first portion 564' of the encoded second slice 564, while the image decoder 405 performs decoding on a second portion 562" of the encoded first slice 562. The image decoder 405 may perform decoding on a first portion 566' of the encoded third slice 566, while the image decoder 405 performs decoding on a third portion 562''' of the encoded first slice 562 and on a second portion 564" of the encoded second slice 564. The image decoder 405 may perform decoding on a second portion 566" of the encoded third slice 566, while the image decoder 405 performs decoding on a third portion 564''' of the encoded second slice 564. The image decoder 405 may perform decoding on a third portion 566''' of the encoded third slice 566 to complete decoding.

In one approach, the console 110 combines 570 decoded slices. The image renderer 170 may include the image combiner 410 that combines the decoded slices. The image combiner 410 may combine the slices of the image, in response to receiving a predetermined number of slices of the image.

In one approach, the console 110 renders 580 the combined image. The image renderer 170 may include the image rendering processor 440 that renders the combined image from the image combiner 410. The image generated by the image rendering processor 440 may be processed or compensated by the compensator 185 to correct for optical aberrations or distortions. In some embodiments, the image rendering processor 440 obtains updated sensor measurements indicating an updated location and an updated orientation of the HWD 150, and/or an updated gaze direction of the user, and performs a shading process and/or a reprojection process on the combined image to generate an image of an artificial reality corresponding to the updated location and the updated orientation of the HWD 150, and/or the updated gaze direction of the user. Moreover, the image rendering processor 440 may render or present the image corresponding to the updated location and the updated orientation of the HWD 150, and/or the updated gaze direction of the user.

Advantageously, the process 500 allows a faster, efficient and/or successful transmission and rendition of an image of an artificial reality space by slicing an image into a plurality of slices and processing the plurality of slices through a pipeline configuration in a staggered manner. In one aspect, encoding and decoding a high quality image (e.g., 1920 by 1080 pixels, 2048 by 1152 pixels, or higher) may consume a large amount of computational resources and may not be completed within a frame time. For example, a number of pixels increases, amount of computations resources for encoding or decoding may increase exponentially. By encoding and decoding slices of an image through a pipeline configuration, the amount of computational resources for encoding and decoding can be reduced compared to encoding and decoding the full image. Moreover, an image generated by the console 110 can be transmitted and rendered by the HWD 150 within a short time period (e.g., 11 ms) by processing slices of the image in a pipeline configuration.

Figure 6:
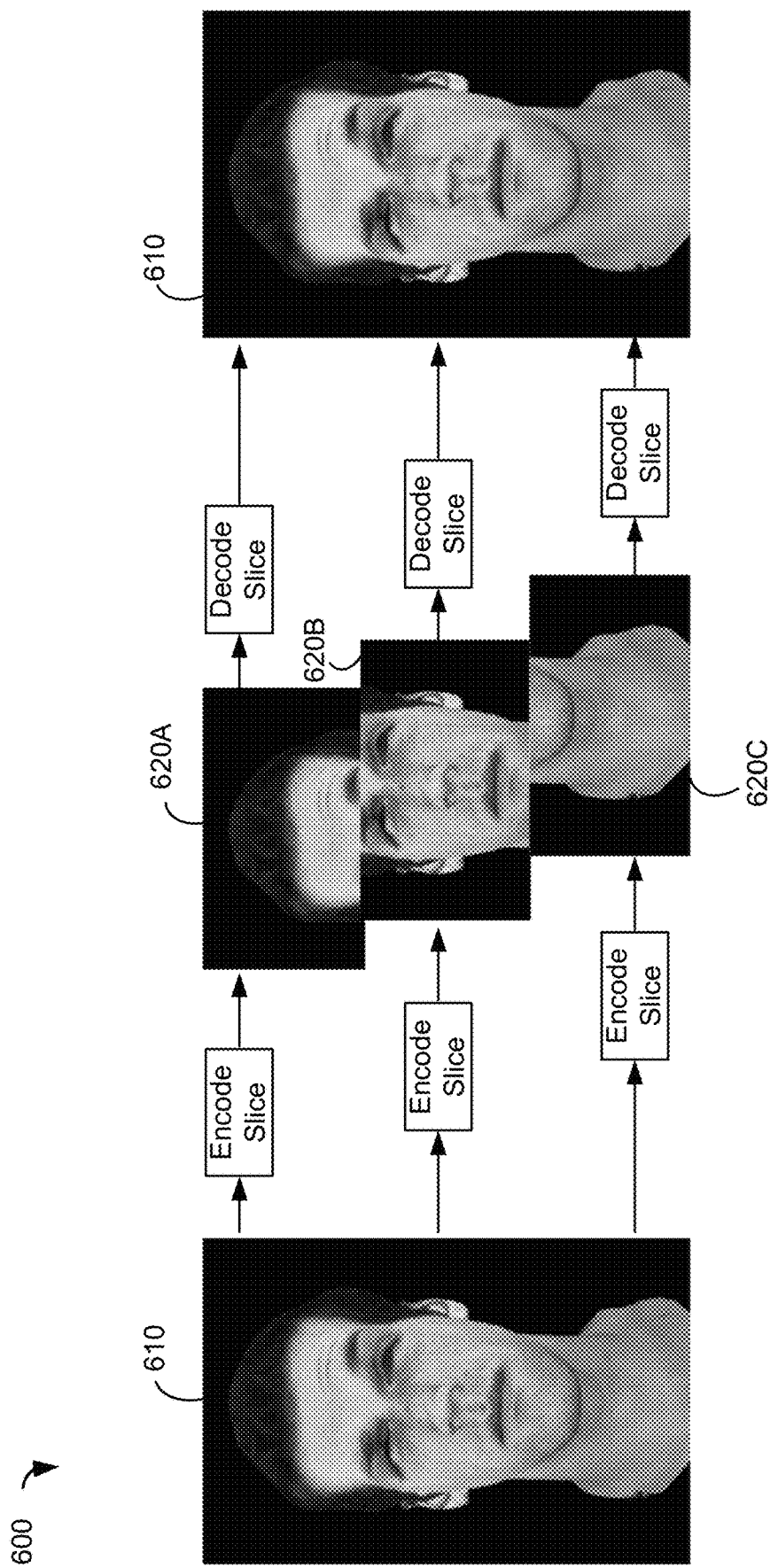
FIG. 6 shows an example process of remote rendering based on slice encoding and decoding, according to an example implementation of the present disclosure.

FIG. 6 shows an example process 600 of slicing an image 610 into a plurality of slices and transmitting the slices for rendering the image 610 (e.g., of an artificial reality space), according to an example implementation of the present disclosure. In one example, the console 110 receives sensor measurements indicating a location and/or an orientation of the HWD 150, and/or a gaze direction of a user of the HWD 150, and generates an image 610 of an artificial reality according to the sensor measurements. In one example, the console 110 divides the image 610 into three slices. In one example, the console 110 may divide the image 610 into more or different number of slices.

In some embodiments, the console 110 encodes slices of the image 610 and transmits the encoded slices of the image 610 in a pipeline configuration. For example, the console 110 encodes a first slice of the image 610. The console 110 may also encode a portion of a second slice of the image 610, while a portion of the first slice of the image is undergoing encoding. Similarly, the console 110 may encode a portion of a third slice of the image 610, while another portion of the second slice of the image is encoded. Once the encoding of the first slice of the image is complete, the console 110 may transmit a portion of the encoded first slice 620A of the image, while encoding of a portion of the second slice of the image is still performed. Similarly, once the encoding of the second slice of the image is complete, the console 110 may transmit a portion of the encoded second slice 620B of the image, while encoding of a portion of the third slice of the image is still performed. Once the encoding of the third slice of the image is complete, the console 110 may transmit the encoded third slice 620C of the image.

In some embodiments, the HWD 150 receives compressed or encoded slices 620A, 620B, 620C of the image from the console 110, and decompresses or decodes the encoded slices of the image in a pipeline configuration. In one approach, the HWD 150 receives a portion of the encoded first slice 620A of the image from the console 110. The HWD 150 may start to receive the encoded second slice 620B of the image, while a portion of the encoded first slice 620A of the image is received. The HWD 150 may also receive a portion of the encoded third slice 620C of the image, while a portion of the encoded second slice 620B of the image is received. After receiving the encoded first slice 620A of the image, the HWD 150 may start decoding a portion of the encoded first slice 620A of the image, while a portion of the encoded second slice 620B of the image is received. If the decoding of the encoded first slice 620A of the image is incomplete, the image decoder 405 may decode a portion of the encoded second slice 620B of the image, while a portion of the encoded first slice 620A of the image is decoded. The image decoder 405 may also decode a portion of the encoded third slice 620C of the image, while a portion of the encoded second slice 620B of the image is decoded. The HWD 150 may combine the decoded slices of the image, and can render the combined image 610 for presentation.

Figure 7A:
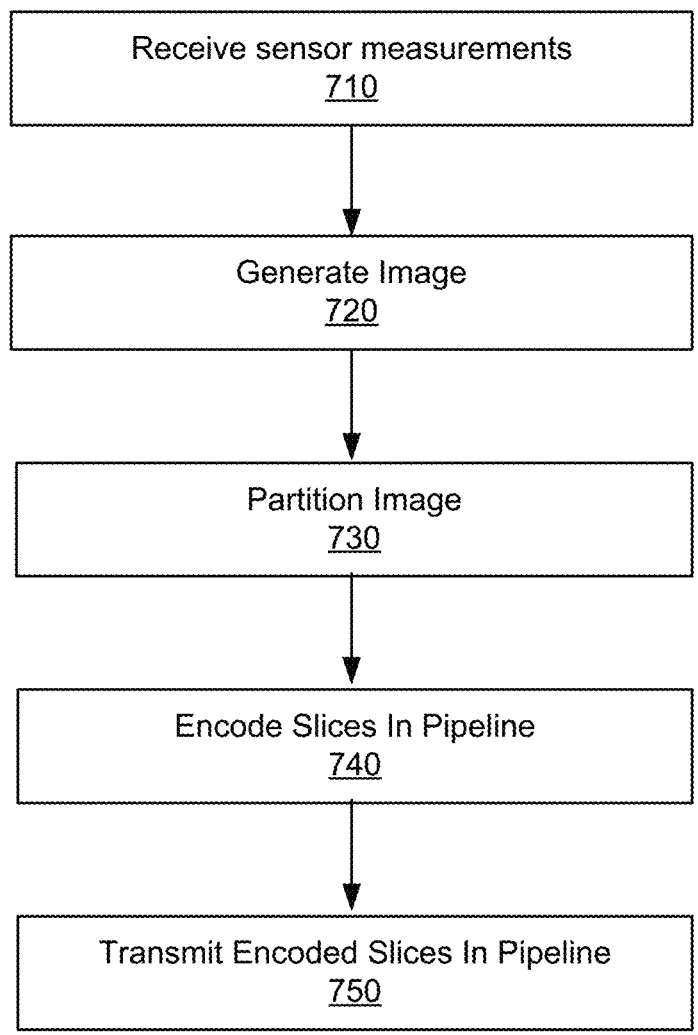
FIG. 7A is an interaction diagram of a process of generating and transmitting encoded slices of an image of an artificial reality, according to an example implementation of the present disclosure.

FIG. 7A is an interaction diagram of a process 700 of generating and transmitting encoded slices of an image of an artificial reality, according to an example implementation of the present disclosure. In some embodiments, the process 700 is performed by the console 110 (or the content provider 130). In some embodiments, the process 700 is performed by other entities. In some embodiments, the process 700 includes more, fewer, or different steps than shown in FIG. 7A.

In one approach, the console 110 receives 710 sensor measurements from the HWD 150. The console 110 may include a communication interface 115 that receives the sensor measurements from the HWD 150. The communication interface 115 may receive the sensor measurements through a wired link (e.g., ETHERNET, USB, HDMI, etc.) or a wireless link (e.g., Wi-Fi, Bluetooth, or cellular data network standards (e.g., 3G, 4G, 5G, 60 GHz, LTE, etc.)).

In one approach, the console 110 generates 720 an image of an artificial reality according to the sensor measurements. The console 110 may include a content provider 130 that determines and/or provides a view of the artificial reality according to the location and orientation of the HWD 150 and/or the gaze direction of the user of the HWD 150. For example, the content provider 130 includes the artificial space image generator 310 that maps the location of the HWD 150 in a physical space to a location within an artificial reality space, and determines a view of the artificial reality space along a direction corresponding to an orientation of the HWD 150 and/or the gaze direction of the user from the mapped location in the artificial reality space. The artificial space image generator 310 may generate image data describing an image of the determined view of the artificial reality space.

In one approach, the console 110 divides, slices, or partitions 730 the image into a plurality of slices 542, 544, 546. The content provider 130 may include the image slicer 320 that divides the image into a predetermined number of slices 542, 544, 546. The number of slices may be determined based on timing for encoding, transmitting and decoding a slice to allow an image to be generated by the console 110 and presented by the HWD 150 within a frame time (e.g., 11 ms). Although in the example shown in FIG. 5, the image slicer 320 divides the image into three slices 542, 544, 546, the image slicer 320 may divide the image into any number (e.g., two or higher) of slices. For example, the image slicer 320 divides the image along a horizontal direction, a vertical direction, or any direction.

In one approach, the console 110 encodes 740 slices in a pipeline configuration. The console 110 may include the image encoder 330 that encodes the slices 542, 544, 546. For example, the image encoder 330 performs encoding on the first slice 542. The image encoder 330 may perform encoding on a first portion 542' of the first slice 542, while the image encoder 330 does not perform encoding on the other slices 544, 546. The image encoder 330 may perform encoding on a first portion 544' of the second slice 544, while the image encoder 330 performs encoding on a second portion 542" of the first slice 542. The image encoder 330 may perform encoding on a first portion 546' of the third slice 546, while the image encoder 330 performs encoding on a third portion 542''' of the first slice 542 and on a second portion 544 of the second slice 544. The image encoder 330 may perform encoding on a second portion 546" of the third slice 546, while the image encoder 330 performs encoding on a third portion 544''' of the second slice 544. Then, the image encoder 330 may perform encoding on a third portion 546''' of the third slice 546 to complete encoding.

In one approach, the console 110 transmits 750 the encoded slices in a pipeline configuration. The communication interface 115 may transmit the encoded slices through a wired link (e.g., ETHERNET, USB, HDMI, etc.) or a wireless link (e.g., Wi-Fi, Bluetooth, or cellular data network standards (e.g., 3G, 4G, 5G, 60 GHz, LTE, etc.)). The communication interface 115 may transmit the encoded slices in a staggered manner or a partially overlapping manner. For example, after completing encoding of the first slice 542, the communication interface 115 may transmit 552 the encoded first slice to the HWD 150, while the image encoder 330 encodes the third portion 544''' of the second slice 544. For example, after completing encoding of the second slice 544, the communication interface 115 may transmit 554 the encoded second slice to the HWD 150, while the image encoder 330 encodes the third portion 546''' of the third slice 546. After completing encoding of the third slice 546, the communication interface 115 may transmit 556 the encoded third slice to the HWD 150.

Figure 7B:
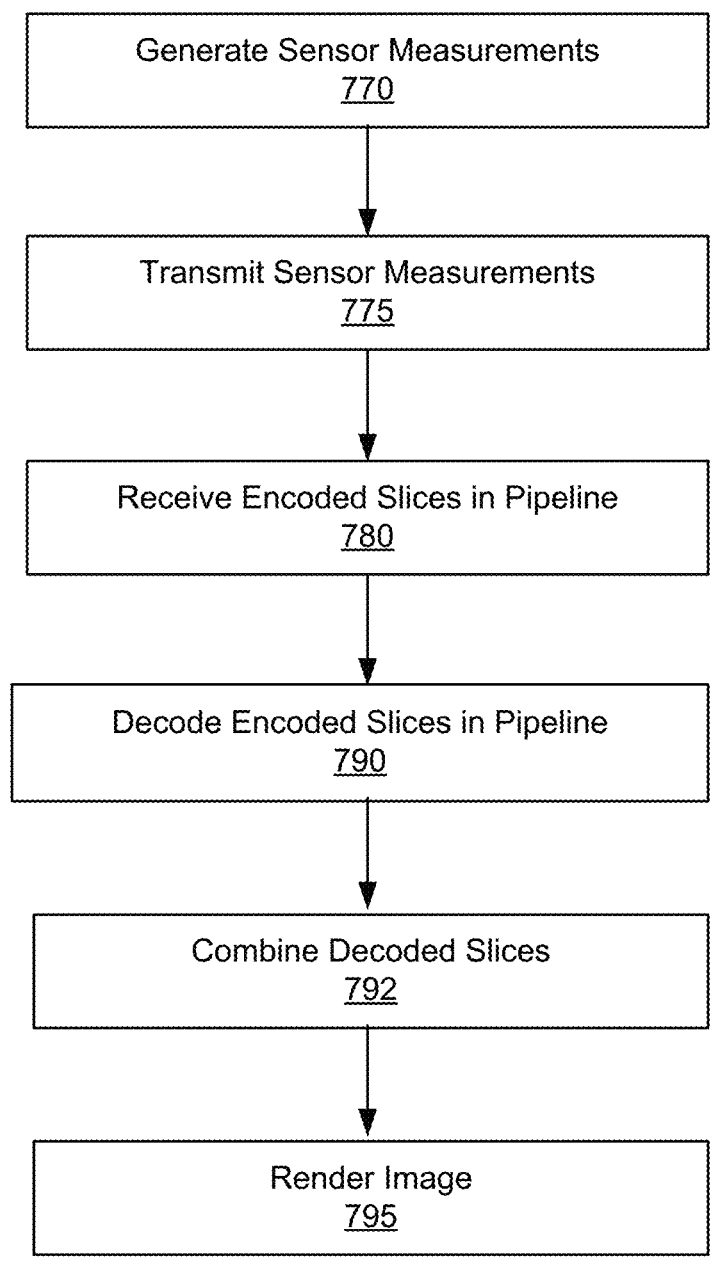
FIG. 7B is an interaction diagram of a process of receiving encoded slices of an image of an artificial reality and rendering the image of the artificial reality, according to an example implementation of the present disclosure.

FIG. 7B is an interaction diagram of a process 760 of receiving encoded slices of an image of an artificial reality and rendering the image of the artificial reality, according to an example implementation of the present disclosure. In some embodiments, the process 760 is performed by the HWD 150 (or the image renderer 170). In some embodiments, the process 760 is performed by other entities. In some embodiments, the process 760 includes more, fewer, or different steps than shown in FIG. 7B.

In one approach, the HWD 150 generates 770 sensor measurements indicating a location and an orientation of the HWD 150. The HWD 150 may include sensors 155 that detect a location and an orientation of the HWD 150, and generate sensor measurements indicating the detected location and orientation of the HWD 150. The HWD 150 may also include eye trackers 160 that detect a gaze direction of the eyes of the user, and generate sensor measurements indicating the detected gaze direction. In some embodiments, a user of the HWD 150 is prompted to enable or disable the eye trackers 160.

In one approach, the HWD 150 transmits 775 sensor measurements to the console 110. The HWD 150 may include the communication interface 165 that transmits the sensor measurements to the console 110. The communication interface 165 may transmit the sensor measurements through a wired link (e.g., ETHERNET, USB, HDMI, etc.) or a wireless link (e.g., Wi-Fi, Bluetooth, or cellular data network standards (e.g., 3G, 4G, 5G, 60 GHz, LTE, etc.)).

In one approach, the HWD 150 receives 780 the encoded slices from the console 110 in a pipeline configuration, in response to the sensor measurements transmitted. The communication interface 165 may receive the encoded slices from the console 110 in a pipeline configuration.

In one approach, the HWD 150 decodes 790 the encoded slices in a pipeline configuration. The HWD 150 may include the image renderer 170 that decodes the encoded slices in a staggered manner or a partially overlapping manner in time. For example, the image renderer 170 includes the image decoder 405 that performs decoding on the encoded first slice 562. The image decoder 405 may perform decoding on a first portion 562' of the encoded first slice 562, while the image decoder 405 does not perform decoding on the other encoded slices 564, 566. The image decoder 405 may perform decoding on a first portion 564' of the encoded second slice 564, while the image decoder 405 performs decoding on a second portion 562" of the encoded first slice 562. The image decoder 405 may perform decoding on a first portion 566' of the encoded third slice 566, while the image decoder 405 performs decoding on a third portion 562''' of the encoded first slice 562 and on a second portion 564" of the encoded second slice 564. The image decoder 405 may perform decoding on a second portion 566" of the encoded third slice 566, while the image decoder 405 performs decoding on a third portion 564''' of the encoded second slice 564. The image decoder 405 may perform decoding on a third portion 566''' of the encoded third slice 566 to complete decoding.

In one approach, the console 110 combines 792 decoded slices. The image renderer 170 may include the image combiner 410 that combines the decoded slices. The image combiner 410 may combine the slices of the image, in response to receiving a predetermined number of slices of the image.

In one approach, the console 110 renders 795 the combined image. The image renderer 170 may include the image rendering processor 440 that renders the combined image from the image combiner 410. The image generated by the image rendering processor 440 may be processed or compensated by the compensator 185 to correct for optical aberrations or distortions. In some embodiments, the image rendering processor 440 obtains updated sensor measurements indicating an updated location and an updated orientation of the HWD 150, and/or an updated gaze direction of the user, and performs a shading process and/or a reprojection process on the combined image to generate an image of an artificial reality corresponding to the updated location and the updated orientation of the HWD 150, and/or the updated gaze direction of the user. Moreover, the image rendering processor 440 may render or present the image corresponding to the updated location and the updated orientation of the HWD 150, and/or the updated gaze direction of the user.

Figure 8:
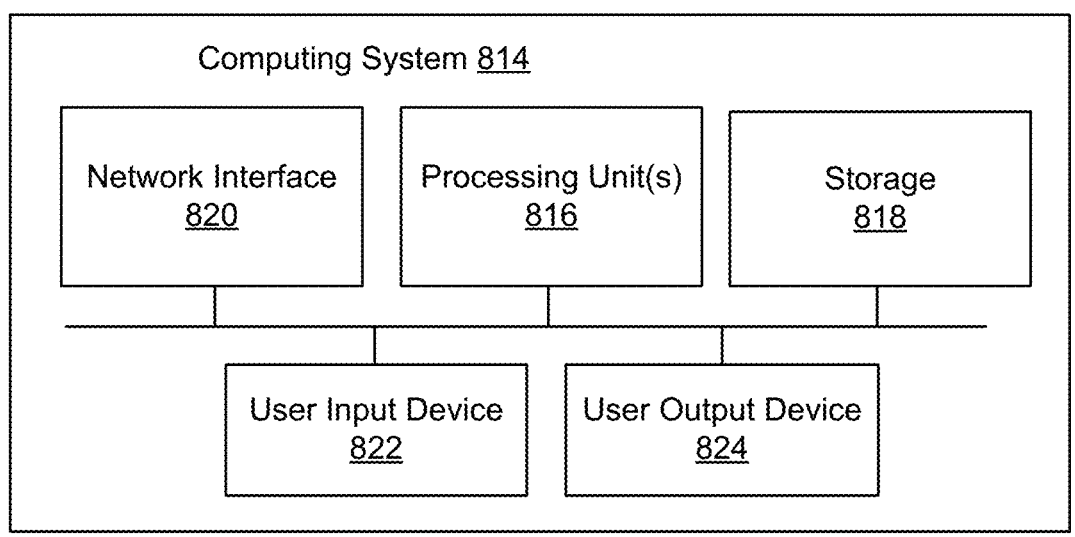
FIG. 8 is a block diagram of a computing environment according to an example implementation of the present disclosure.

Various operations described herein can be implemented on computer systems. FIG. 8 shows a block diagram of a representative computing system 814 usable to implement the present disclosure. In some embodiments, the console 110, the HWD 150 or both of FIG. 1 are implemented by the computing system 814. Computing system 814 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 814 can be implemented to provide VR, AR, MR experience. In some embodiments, the computing system 814 can include conventional computer components such as processors 816, storage device 818, network interface 820, user input device 822, and user output device 824.

Network interface 820 can provide a connection to a wide area network (e.g., the Internet) to which WAN interface of a remote server system is also connected. Network interface 820 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 822 can include any device (or devices) via which a user can provide signals to computing system 814; computing system 814 can interpret the signals as indicative of particular user requests or information. User input device 822 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 824 can include any device via which computing system 814 can provide information to a user. For example, user output device 824 can include a display to display images generated by or delivered to computing system 814. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 824 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 816 can provide various functionality for computing system 814, including any of the functionality described herein as being performed by a server or client, or other functionality associated with message management services.

It will be appreciated that computing system 814 is illustrative and that variations and modifications are possible. Computer systems used in connection with the present disclosure can have other capabilities not specifically described here. Further, while computing system 814 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A device comprising:
a content generator comprising at least one processor, configured to:
partition an image of an artificial reality space into a plurality of slices,
encode a first slice of the plurality of slices during a first time period between a first time and a second time, the encoding of the first slice starting at the first time and completing at the second time, and
encode a second slice of the plurality of slices during a second time period between a third time and a fourth time, the encoding of the second slice starting at the third time and completing at the fourth time, wherein the third time is after the first time and before the second time; and
a communication interface coupled to the content generator, the communication interface configured to:
transmit the encoded first slice of the plurality of slices to a head wearable display during a third time period between a fifth time and a sixth time, wherein the fifth time is after the second time, and the transmission of the encoded first slice starts at the fifth time and completes at the sixth time, and
transmit the encoded second slice of the plurality of slices to the head wearable display during a fourth time period between a seventh time and an eighth time, wherein the seventh time is after the fourth time, and the transmission of the encoded second slice starts at the seventh time, and wherein the seventh time is after the fifth time and before the sixth time.

2. The device of claim 1, wherein the first slice and the second slice are separated by a boundary.

3. The device of claim 2, wherein the content generator is further configured to generate motion vectors of the image, wherein the motion vectors do not traverse the boundary between the first slice and the second slice.

4. The device of claim 1, wherein the communication interface is configured to transmit another portion of the encoded first slice, while the content generator encodes a portion of the second slice.

5. The device of claim 1,
wherein the content generator is further configured to encode a third slice of the plurality of slices during a fifth time period between a ninth time and a tenth time, wherein the ninth time is after the third time and before the second time, and
wherein the communication interface is further configured to transmit the encoded third slice of the plurality of slices to the head wearable display during a sixth time period between an eleventh time and a twelfth time, wherein the eleventh time is after the seventh time and before the sixth time.

6. The device of claim 5, wherein the communication interface is configured to transmit an additional portion of the encoded second slice, while the content generator encodes a portion of the third slice.

7. The device of claim 1,
wherein the communication interface is further configured to receive sensor measurements indicating a location or an orientation of the head wearable display, and
wherein the content generator is configured to generate the image of the artificial reality space according to the location or the orientation of the head wearable display.

8. A method comprising:
partitioning, by a device, an image of an artificial reality space into a plurality of slices;
encoding, by the device, a first slice of the plurality of slices during a first time period between a first time and a second time, the encoding of the first slice starting at the first time and completing at the second time;
encoding, by the device, a second slice of the plurality of slices during a second time period between a third time and a fourth time, the encoding of the second slice starting at the third time and completing at the fourth time, wherein the third time is after the first time and before the second time;
transmitting, by the device, the encoded first slice of the plurality of slices to a head wearable display during a third time period between a fifth time and a sixth time, wherein the fifth time is after the second time, and the transmission of the encoded first slice starts at the fifth time and completes at the sixth time; and transmitting, by the device, the encoded second slice of the plurality of slices to the head wearable display during a fourth time period between a seventh time and an eighth time, wherein the seventh time is after the fourth time, and the transmission of the encoded second slice starts at the seventh time, and wherein the seventh time is after the fifth time and before the sixth time.

9. The method of claim 8, wherein the first slice and the second slice are separated by a boundary.

10. The method of claim 9, further comprising:
generating, by the device, motion vectors of the image, wherein the motion vectors do not traverse the boundary between the first slice and the second slice.

11. The method of claim 8, further comprising:
transmitting, by the device, another portion of the encoded first slice, while the device encodes a portion of the second slice.

12. The method of claim 8, further comprising:
encoding, by the device, a third slice of the plurality of slices during a fifth time period between a ninth time and a tenth time, wherein the ninth time is after the third time and before the second time; and
transmitting, by the device, the encoded third slice of the plurality of slices to the head wearable display during a sixth time period between an eleventh time and a twelfth time, wherein the eleventh time is after the seventh time and before the sixth time.

13. The method of claim 12, further comprising:
transmitting, by the device, an additional portion of the encoded second slice, while the device encodes a portion of the third slice.

14. The method of claim 8, further comprising:
receiving, by the device, sensor measurements indicating a location or an orientation of the head wearable display; and
generating, by the device, the image of the artificial reality space according to the location or the orientation of the head wearable display.

15. A device comprising:
a communication interface configured to:
receive, from another device, an encoded first slice of an image of an artificial reality space during a first time period between a first time and a second time, the encoding of the first slice starting at the first time and completing at the second time, and
receive, from the another device, an encoded second slice of the image during a second time period between a third time and a fourth time, the encoding of the second slice starting at the third time and completing at the fourth time, wherein the third time is after the first time and before the second time; and
an image renderer comprising at least one processor, the image renderer coupled to the communication interface, the image renderer configured to:
decode the encoded first slice of the image during a third time period between a fifth time and a sixth time, wherein the fifth time is after the second time, and the decoding of the encoded first slice starts at the fifth time and completes at the sixth time,
decode the encoded second slice of the image during a fourth time period between a seventh time and an eighth time, wherein the seventh time is after the fourth time, and the decoding of the encoded second slice starts at the seventh time, and wherein the seventh time is after the fifth time and before the sixth time,
combine the decoded first slice of the image and the decoded second slice of the image, and
render the image based on the combination of the decoded first slice of the image and the decoded second slice of the image.

16. The device of claim 15, wherein the communication interface is configured to receive a portion of the encoded second slice, while the image renderer decodes an additional portion of the encoded first slice.

17. The device of claim 16, wherein the decoded first slice and the decoded second slice are separated by a boundary.

18. The device of claim 17, wherein motion vectors of the decoded first slice and motion vectors of the decoded second slice do not traverse the boundary between the decoded first slice and the decoded second slice.

19. The device of claim 15,
wherein the communication interface is further configured to receive an encoded third slice of the plurality of slices from the another device during a fifth time period between at a ninth time and a tenth time, wherein the ninth time is after the third time and before the second time, and
wherein the image renderer is further configured to decode the encoded third slice of the plurality of slices during a sixth time period between an eleventh time and a twelfth time, wherein the eleventh time is after the seventh time and before the sixth time.

20. The device of claim 15, further comprising:
sensors configured to generate sensor measurements indicating a location or an orientation of the device,
wherein the communication interface is configured to transmit the sensor measurements to the another device, and receive the encoded first slice and the encoded second slice of the image, in response to transmitting the sensor measurements.

* * * * *